Patented July 23, 1929.

1,721,873

UNITED STATES PATENT OFFICE.

EWALD SPER, OF WANNOV, CZECHOSLOVAKIA.

PROCESS FOR OBTAINING CHLORINATION PRODUCTS FROM HYDROCARBONS.

No Drawing. Application filed September 19, 1925, Serial No. 57,462, and in Germany, September 27, 1924.

When chlorinating saturated hydrocarbons such as methane, ethane and the like, the temperature of the reacting gases is liable to become so high, owing to the great heat of formation of the hydrochloric acid produced, that the reaction may easily become explosive. Attempts have hitherto been made to prevent this dangerous tendency of the mixture of chlorine and hydrocarbons to explode either by using a considerable excess of one or other of the reacting gases so as to act as a diluent, or by employing other gases for the purpose of dilution, or by allowing the reaction to take place in liquid media which regulate the speed of the reaction as may be desired.

It has now been found that the chlorination of saturated hydrocarbons may be effected with complete freedom from danger if the reaction be carried out in reaction chambers which are filled with graphite and the temperature necessary for the reaction be maintained in the chamber by suitable means. The tightly packed graphite, which is preferably employed in the form of relatively small, irregularly shaped pieces, owing to its good heat conducting and distributing properties, ensures the reaction taking place quietly and has a far-reaching effect in the prevention of secondary reactions. It is therefore possible by means of the present process, to effect the chlorination of hydrocarbons to produce the various chlorides in such a manner that substantially only the desired chloride is produced, by employing the amount of chlorine theoretically necessary to produce the chloride in question.

In carrying out the process the chlorine and hydrocarbon are suitably conducted separately into a mixing chamber, which is also filled with pieces of graphite, and the gas mixture is then passed either directly or through pipes filled with pieces of graphite into the reaction chamber.

Owing to the high degree of concentration of the chlorination products in the gases of the reaction they can usually be condensed to a large extent from the dry gases by cooling, before the hydrochloric acid is absorbed by water or solutions of alkaline compounds. The last portions of the chlorination products can, after the separation of the hydrochloric acid, be absorbed in a suitable washing medium and then recovered therefrom in known manner.

I claim:—

The process for the production of chloro-derivatives of a saturated hydrocarbon which comprises contacting the saturated hydrocarbon in the gaseous state and chlorine gas in an amount sufficient to produce the desired chloro-derivatives at reacting temperature and in a reaction space substantially filled with small pieces of graphite, and then separating the resulting chloro-derivative from the gaseous reaction mixture.

EWALD SPER.